United States Patent
Thomas et al.

(10) Patent No.: US 12,098,063 B2
(45) Date of Patent: Sep. 24, 2024

(54) COMPACT TOOL CARRIER AND MAINFRAMES FOR A SELF-PROPELLED MACHINE

(71) Applicant: Vermeer Manufacturing Company, Pella, IA (US)

(72) Inventors: Brad Thomas, Pleasant Hill, IA (US); Louis Hartke, Pella, IA (US); Greg Langenfeld, Bettendorf, IA (US); Matt Hutchinson, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 17/961,868

(22) Filed: Oct. 7, 2022

(65) Prior Publication Data

US 2023/0026446 A1    Jan. 26, 2023

Related U.S. Application Data

(63) Continuation of application No. 17/397,200, filed on Aug. 9, 2021, now Pat. No. 11,465,891, which is a
(Continued)

(51) Int. Cl.
*B66F 9/06* (2006.01)
*B60P 1/48* (2006.01)
(Continued)

(52) U.S. Cl.
CPC .............. *B66F 9/065* (2013.01); *B60P 1/483* (2013.01); *B66F 9/06* (2013.01); *B66F 9/07572* (2013.01);
(Continued)

(58) Field of Classification Search
CPC .... B62D 21/16; B62D 21/186; B62D 51/007; B62D 51/02; B62D 51/04; B66F 9/065;
(Continued)

(56) References Cited

U.S. PATENT DOCUMENTS

| | | | |
|---|---|---|---|
| 1,808,735 A | 6/1931 | Henneuse et al. | |
| 2,298,450 A | 10/1942 | Baker | |

(Continued)

FOREIGN PATENT DOCUMENTS

| | | |
|---|---|---|
| EP | 2280122 A1 | 2/2011 |
| FR | 2209015 A1 | 6/1974 |

(Continued)

OTHER PUBLICATIONS

The Toro Company, Toro Operator's Manual TX 427 Compact Utility Loader, Form No. 3373-546 Rev B, published 2012, 48 pages.

(Continued)

*Primary Examiner* — Dean J Kramer
(74) *Attorney, Agent, or Firm* — Armstrong Teasdale LLP (57) ABSTRACT

Mainframes for a self-propelled machine are disclosed. The mainframe includes first and second pockets that extend from the front end to the rear end of the mainframe. A hydraulic reservoir housing extends from the first side to the second side of the mainframe. The hydraulic reservoir housing is disposed between the front end of the mainframe and first and second drive openings.

14 Claims, 7 Drawing Sheets

Related U.S. Application Data continuation of application No. 16/270,070, filed on Feb. 7, 2019, now abandoned, which is a continuation of application No. 15/704,685, filed on Sep. 14, 2017, now Pat. No. 10,202,266, which is a continuation of application No. 15/062,801, filed on Mar. 7, 2016, now Pat. No. 9,975,750, which is a continuation of application No. 14/691,649, filed on Apr. 21, 2015, now Pat. No. 9,321,386.

(60) Provisional application No. 62/118,860, filed on Feb. 20, 2015.

(51) Int. Cl.

| | | |
|---|---|---|
| *B66F 9/065* | (2006.01) | |
| *B66F 9/075* | (2006.01) | |
| *B66F 9/22* | (2006.01) | |
| *E02F 3/34* | (2006.01) | |
| *E02F 3/96* | (2006.01) | |
| *E02F 9/08* | (2006.01) | |
| *E02F 9/20* | (2006.01) | |

(52) U.S. Cl.
CPC ........ *B66F 9/07577* (2013.01); *B66F 9/0759* (2013.01); *B66F 9/22* (2013.01); *E02F 3/3405* (2013.01); *E02F 3/3414* (2013.01); *E02F 3/96* (2013.01); *E02F 9/08* (2013.01); *E02F 9/205* (2013.01)

(58) Field of Classification Search
CPC .. B66F 9/075; B66F 9/07513; B66F 9/07518; B66F 9/07527; B66F 9/07572; B66F 9/07577; B60P 1/483; E02F 9/08; E02F 9/0816; E02F 9/0825
See application file for complete search history.

(56) References Cited

U.S. PATENT DOCUMENTS

| | | | |
|---|---|---|---|
| 2,345,620 A | 4/1944 | Mork | |
| 2,455,474 A | 12/1948 | Drott | |
| 2,558,928 A | 7/1951 | Bryan | |
| 2,563,277 A | 8/1951 | Roeder | |
| 2,774,496 A | 12/1956 | Dorkins | |
| 2,849,132 A | 8/1958 | Clark | |
| 2,953,264 A | 9/1960 | Bronislaus | |
| 2,980,271 A | 4/1961 | Bronislaus | |
| 3,021,150 A * | 2/1962 | Bronislaus | B62D 7/00 280/124.113 |
| 3,074,572 A | 1/1963 | Bronislaus | |
| 3,586,195 A | 6/1971 | Beltrami | |
| 3,908,778 A | 9/1975 | Sien | |
| 4,087,101 A | 5/1978 | Shimazaki et al. | |
| 4,117,610 A | 10/1978 | Yates | |
| 4,186,812 A | 2/1980 | Sutton | |
| 4,239,444 A | 12/1980 | Schmelzer | |
| 4,645,264 A * | 2/1987 | Morrison | B62D 51/005 165/41 |
| 5,169,278 A | 12/1992 | Hoechst | |
| D359,497 S | 6/1995 | Rayner | |
| 5,423,654 A | 6/1995 | Rohrbaugh | |
| 5,470,190 A | 11/1995 | Bamford | |
| 5,520,500 A | 5/1996 | McIlwain et al. | |
| 5,542,814 A | 8/1996 | Ashcroft | |
| 5,551,523 A | 9/1996 | Berg et al. | |
| 5,609,464 A | 3/1997 | Moffitt | |
| 5,894,908 A | 4/1999 | Eftefield | |
| D431,574 S | 10/2000 | Porter | |
| 6,182,778 B1 | 2/2001 | Henshaw et al. | |
| 6,205,665 B1 | 3/2001 | Anderson et al. | |
| 6,325,589 B1 | 12/2001 | Jang | |
| 6,474,933 B1 | 11/2002 | Hoechst | |
| 6,575,262 B2 | 6/2003 | Nagatsuka | |
| 6,616,398 B2 | 9/2003 | Dershem | |
| 6,695,568 B2 | 2/2004 | Bares | |
| 6,866,466 B2 | 3/2005 | Roan | |
| 7,214,026 B2 | 5/2007 | Hilvers | |
| 7,264,435 B2 | 9/2007 | Layko | |
| 7,428,943 B2 | 9/2008 | Smiley et al. | |
| 7,695,236 B2 | 4/2010 | Green | |
| 7,805,864 B2 | 10/2010 | Azure | |
| 7,866,700 B2 | 1/2011 | Weibling et al. | |
| D631,898 S | 2/2011 | Major | |
| 7,980,569 B2 | 7/2011 | Azure | |
| 8,016,065 B2 | 9/2011 | Osborn et al. | |
| 8,109,356 B2 | 2/2012 | Brock et al. | |
| 8,152,433 B2 | 4/2012 | Yamada | |
| 8,821,104 B2 | 9/2014 | Yasuda | |
| 9,045,882 B2 | 6/2015 | Major | |
| 9,321,386 B1 | 4/2016 | Thomas | |
| 9,975,750 B2 | 5/2018 | Thomas | |
| 10,202,266 B2 | 2/2019 | Thomas et al. | |
| 2003/0095857 A1 | 5/2003 | Degelman | |
| 2004/0026153 A1 | 2/2004 | Dershem | |
| 2004/0228715 A1 | 11/2004 | Roan et al. | |
| 2005/0036876 A1 | 2/2005 | Walto | |
| 2007/0017713 A1 | 1/2007 | Sewell | |
| 2007/0128012 A1 | 6/2007 | Yamada | |
| 2007/0132204 A1 | 6/2007 | Sewell | |
| 2008/0197588 A1 | 8/2008 | Azure | |
| 2009/0116943 A1 | 5/2009 | Valere | |
| 2010/0106344 A1 | 4/2010 | Edwards | |
| 2010/0183412 A1 | 7/2010 | Borntrager | |
| 2011/0137491 A1 | 6/2011 | Self et al. | |
| 2012/0291319 A1 | 11/2012 | Jones | |
| 2012/0305025 A1 | 12/2012 | Helbig | |
| 2014/0271078 A1 | 9/2014 | Koch | |

FOREIGN PATENT DOCUMENTS

| | | |
|---|---|---|
| GB | 832800 A | 2/1958 |
| GB | 947803 A | 3/1961 |
| GB | 883953 A | 12/1961 |
| GB | 2368573 A | 10/2000 |
| JP | S63265022 A | 11/1988 |
| JP | H11140900 A | 5/1999 |
| JP | 2006307498 A | 11/2006 |
| KR | 20080003426 U | 8/2008 |
| KR | 200443753 Y1 | 3/2009 |

OTHER PUBLICATIONS https://www.youtube.com/watch?v=tJ-Hwn8DaTQ, Thomas 35 Series Compact Tool Carrier, published Aug. 4, 2012.
ISO 3411:2007, Earth-moving machinery—Physical dimensions of operators and minimum operator space envelope, dated Jul. 2007, pp. 24.
ISO 6682:2008, Earth-moving machinery—Zones of comfort and reach for controls, dated Sep. 2008, pp. 18.
Bobcat, Mini Track Loaders, available before Feb. 20, 2015, pp. 1.
Toro, Dingo Compact Utility Loader, available before Feb. 20, 2015, pp. 1.
Ditch Witch, SK850 Mini Skid Steer, available before Feb. 20, 2015, pp. 1.
Cat, 252B Skid Steer Loader, available before Feb. 20, 2015, pp. 1.
Deere, 318D Skid Steer, available before Feb. 20, 2015, pp. 1.
New Holland, C232 Skid Steer Loader, available before Feb. 20, 2015, pp. I.
JCB, 150T Tracked Skid Steer, available before Feb. 20, 2015, pp. 1.
Kubota, SVL75 Compact Track Loader, available before Feb. 20, 2015, pp. 1.
Gehl, V270 Vertical Lift Skid Loader, available before Feb. 20, 2015, pp. 1.
Bobcat, T190 Compact Track Loader, available before Feb. 20, 2015, pp. 1.
Yanmar, S-28-V Skid Steer, available before Feb. 20, 2015, pp. 1.

(56) References Cited

OTHER PUBLICATIONS

Extended European Search Report issued in EP3061874, dated Aug. 1, 2016 (8 pages).
S450TX, Vermeer Manufacturing Company, 2013, 2 pages.
S450TX Parts Manual, Vermeer Manufacturing Company, 2012-2014, 180 pages.
Mustang Skid Steer Loaders, Mustang Manufacturing Company Inc., 2014, 24 pages.
SAE J2752, Surface Vehicle Recommended Practice, Personnel Protection—Compact Tool Carriers, Issued Jun. 2010, 11 pages.
The Toro Company, "Dingo 322 Operators Manual", dated 2000.
The Toro Company, "Dingo 322 Parts Catalog", dated 1999.
For Construction Pros.com, Curt Bennink, "Size-Up Skid-Steer Loaders" article, dated Mar. 15, 2006.
Plowsite.com, "Bobcat Weight Kit" chat forum dialogue, 2001.
Construction Shows, "Case Upgrades its Skid Steer and Compact Tracked Loader Line Up" article, May 16, 2014.
Dingo, "TX413 Operator's Manual", 2004, 40 pgs.
Dingo, "TX413 Parts Catalog", 2004, 40 pgs.
JCB, "Skid Steer and Compact Track Loader Brochure", 2009, 24 pgs.
Litigation Documents filed in *Vermeer Corporation* v. *The Toro Company*, case No. 4:17-cv-00076-CRW-HCA (S.D. IA) (Nov. 2, 2018 and Nov. 30, 2018) (Submitted in Six Parts).
Litigation Documents filed in *Vermeer Manufacturing Company* v. *The Toro Company*, case No. 4:19-cv-00050-CRW-HCA (S.D. IA, filed Feb. 12, 2019).
Bobcat, "MT52 Mini Track Loader Brochure", 4 pages.
Vermeer Manufacturing Company, "S650TX Mini Skid Steer Brochure", 2011, 6 pages.
Vermeer Manufacturing Company, "Mini Skid Steer S800TX Brochure", 2009, 8 pages.
De-designated Discovery Documents in *Vermeer Manufacturing Company* v. *The Toro Company*, case No. 4:19-cv-00050-CRW-HCA (S.D. IA, filed Feb. 12, 2019) (submitted in nine parts).
Health and Safety Authority, Guidance on the Safe Use of Tractors and Machinery on Farms, 2015, 109 pages.
GTC Learning Materials, Level 2, Prepare and operate a tractor with attachments, 2010, 24 pages.
Farm Safety Association Inc. Farm Tractor Safety: A Guide to Safe Farm Tractor Operation, 2009, 27 pages.
Bush Hog Operator's Manual, BH10 Series, Alamo Group Inc., 2013, 140 pages.
Litigation Documents filed in *Vermeer Manufacturing Company* v. *The Toro Company*, Case No. 4:17-cv-00076-CRW-HCA (S.D. IA. filed Feb. 28, 2017) (Submitted in 5 parts).

\* cited by examiner

COMPACT TOOL CARRIER AND MAINFRAMES FOR A SELF-PROPELLED MACHINE

CROSS-REFERENCES TO RELATED APPLICATIONS

This application is a continuation of Ser. No. 17/397,200, filed Aug. 9, 2021, which issued Oct. 11, 2022 as U.S. Pat. No. 11,465,891, which is a continuation of Ser. No. 16/270,070, filed Feb. 7, 2019, which is a continuation of U.S. patent application Ser. No. 15/704,685, filed Sep. 14, 2017, which issued Feb. 12, 2019 as U.S. Pat. No. 10,202,266, which is a continuation of U.S. patent application Ser. No. 15/062,801, filed Mar. 7, 2016, which issued May 22, 2018 as U.S. Pat. No. 9,975,750, which is a continuation of U.S. patent application Ser. No. 14/691,649, filed Apr. 21, 2015, which issued Apr. 26, 2016 as U.S. Pat. No. 9,321,386, which claims the benefit of U.S. Provisional Patent Application No. 62/118,860, filed Feb. 20, 2015, each of which is incorporated herein by reference in its entirety.

FIELD OF THE DISCLOSURE

The field of the disclosure relates mainframes for a self-propelled machine.

BACKGROUND

Compact tool carriers are tool-mounted machines that are capable of working in tight spaces for utility or do-it-yourself home projects. Compact tool carriers are walk-behind units or include a platform on which the operator may stand during use. Compact tool carriers are generally defined (e.g., ISO 6165 (2012) and SAE J2752) as "a self-propelled crawler or wheeled machine having an operating mass of less than 1500 kg with a rigid frame, having either a pedestrian operating position or a standing operator platform at the rear of the machine and either front-mounted interchangeable equipment or lift arms with an attachment bracket capable of coupling to interchangeable, front-mounted attachments." The tool carriers may be attached to a variety of interchangeable tools such as buckets, augers, forks, stump grinders, tillers, rollers and the like.

Compact tool carriers may be distinguished from much larger conventional skid steers in which an operator is seated in the operating position. Compact tool carriers pose difficulty in design relative to full-size skid steers due to variation in weight, complexity and size.

A continuing need exists for compact tool carriers with a relatively low-profile, compact design and/or that are characterized by a more effective loader lifting profile.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a compact tool carrier configured for standing or walk-behind operator control. The carrier has a mass of less than about 1500 kg and includes a loader having an arm and a linkage pivotally attached to the loader arm. An actuator is pivotally attached to the loader arm. The carrier includes a control station having operator controls for propelling the compact tool carrier forward and for raising and lowering the loader. The control station is configured for remote operation or is mounted toward the rear of the compact tool carrier and is adapted to allow for standing or walk-behind operation.

Another aspect of the present disclosure is directed to a compact tool carrier. The carrier comprises a loader and a mainframe for supporting the loader. The mainframe has a first side and a second side with each side having a top and a bottom. The first side of the mainframe has at least two pivot points relative to the loader. The carrier includes a drive mechanism comprising tracks or wheels for propelling the apparatus over a supporting surface. The drive mechanism is attached to the mainframe about a rotational axis. The compact tool carrier has a bottom at which the drive mechanism contacts the supporting surface. The rotational axis and bottom of the compact tool carrier are separated by a vertical distance D1. The rotational axis and each pivot point are separated by a vertical distance. Each vertical distance between the rotational axis and a pivot point is less than 1.5 times D1.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
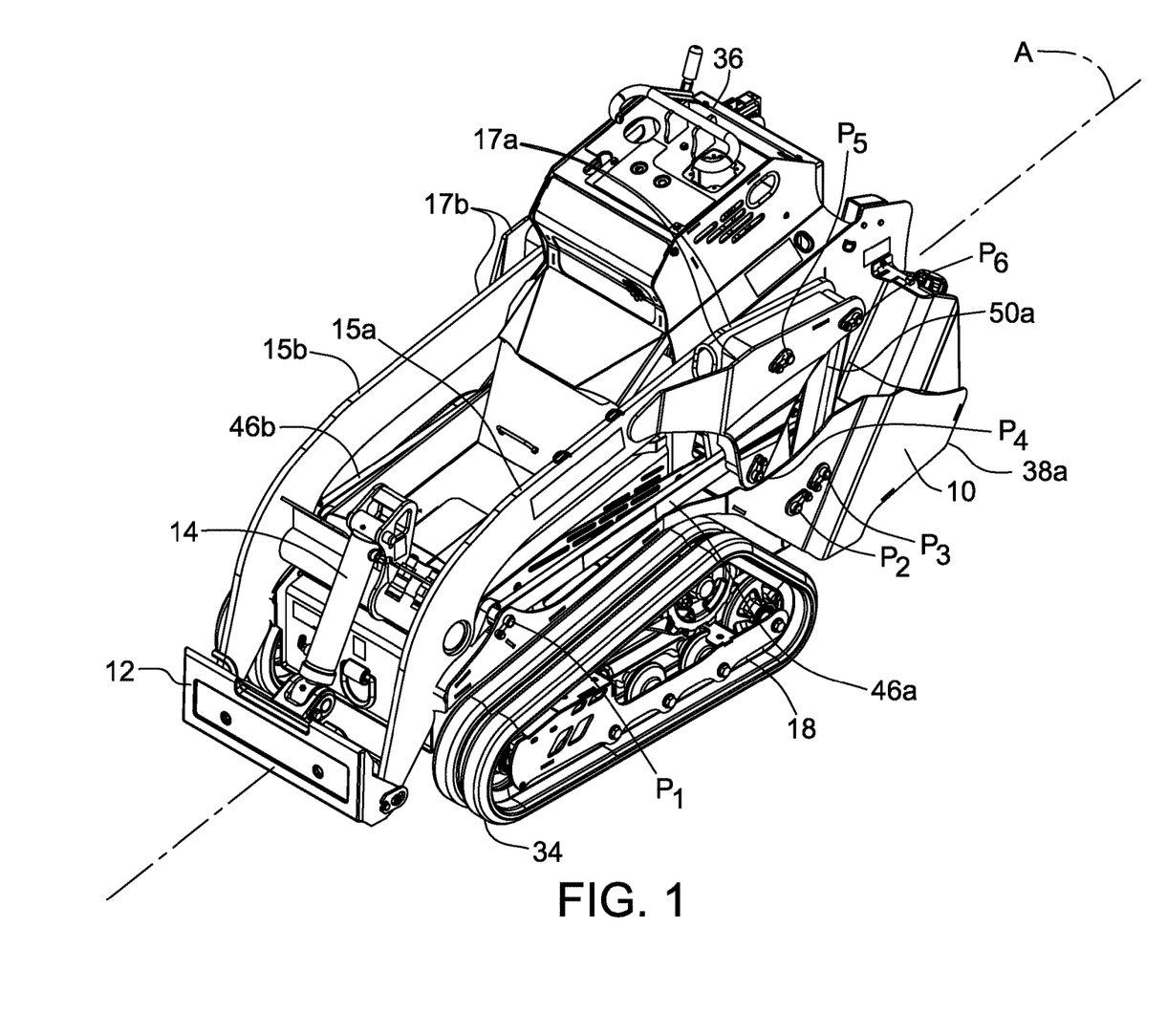
FIG. 1 is a perspective view of a compact tool carrier with the loader in a down position.

An embodiment of a compact tool carrier is generally referred as "5" in FIG. 1. The compact tool carrier 5 includes a loader 8 supported by a mainframe 10. The loader 8 includes an attachment plate 12 for interchangeably attaching any one of a number of tools (not shown). In this regard, such interchangeable tools do not form part of the compact tool carrier 5 unless stated otherwise. The attachment plate 12 is connected to an actuator 14 for tilting of tools connected to the attachment plate 12. The loader 8 has a first arm 15a and a second arm 15b generally opposite the first arm 15a. Each arm 15a, 15b may be a single weldment or may include various components attached by fasteners (e.g., nuts and bolts). The first and second arms 15a, 15b each include a bracket portion 17a, 17b (FIG. 1) for fastening various linkages.

As used herein, "compact tool carrier" refers to machines that are self-propelled and are capable of carrying interchangeable equipment and that generally have a mass (not including the interchangeable tool) of less than about 1500 kg (about 3307 lb). Use of the term "compact tool carrier" herein is intended to exclude full size skid steers (e.g., seat-operated units) due to a large variation in weight, complexity and size. In some embodiments, the compact tool carrier 5 meets the definition of a compact tool carrier provided in ISO 6165 (2012) and SAE J2752 set forth above, both standards being incorporated herein by reference for all relevant and consistent purposes.

The compact tool carrier 5 includes a longitudinal axis A that is parallel to the direction of travel of the carrier (i.e., parallel to its length). The compact tool carrier 5 is generally longitudinally symmetrical (i.e., relative to the longitudinal axis A) in that several components have a corresponding component with the same function opposite the component (i.e., across the axis A). Corresponding components of the pair may be indicated herein by use of a reference number followed by "A" and "B" and may be referred to as a "first" component and a "second" component, respectively. While the compact tool carrier 5 may be described herein with reference to the components of one side of the compact tool carrier 5, any component designated by "A" or "B" herein or shown in FIGS. 1-7 includes a corresponding component with the same function opposite the component.

Figure 2:
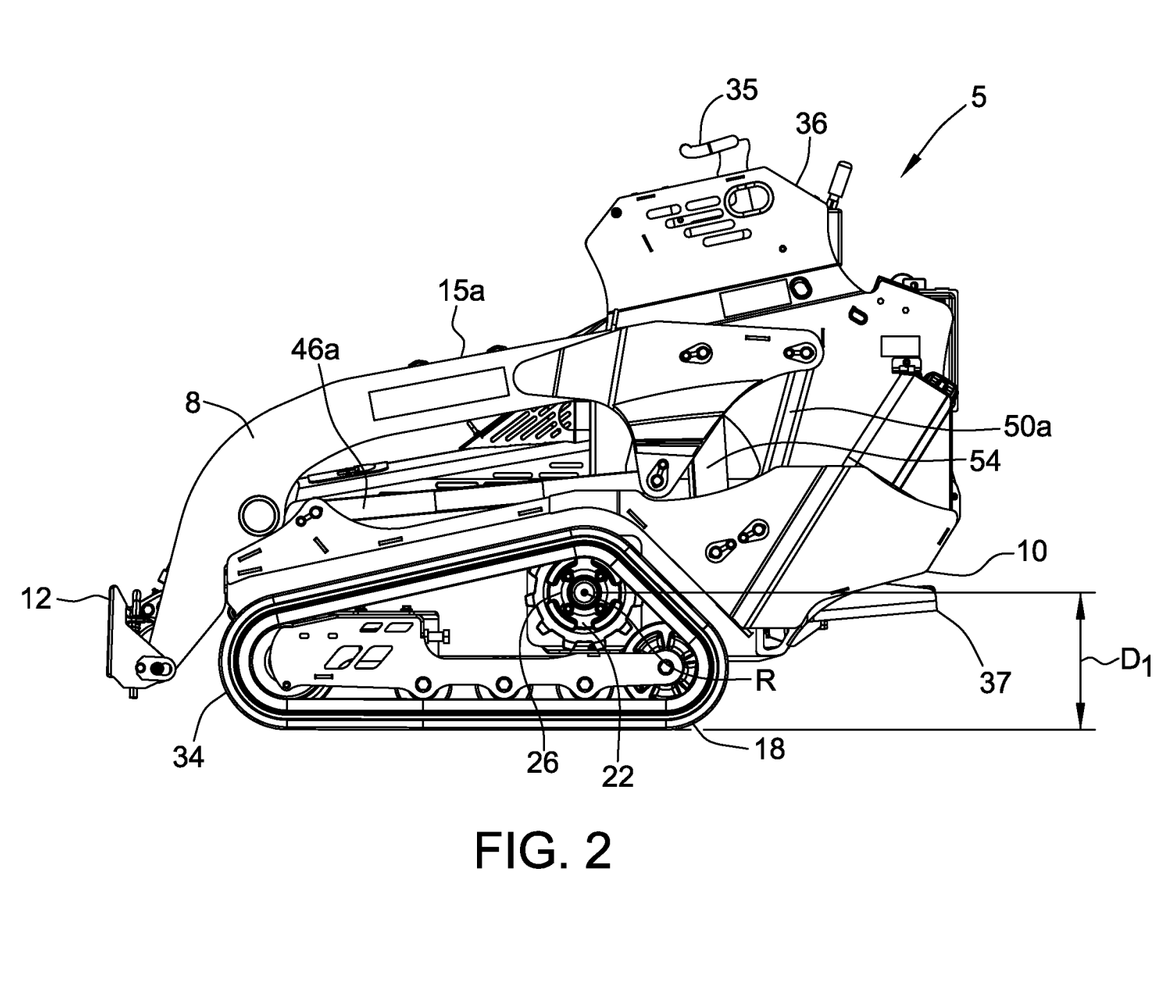
FIG. 2 is a side view of the compact tool carrier with the loader in a down position.
Figure 3:
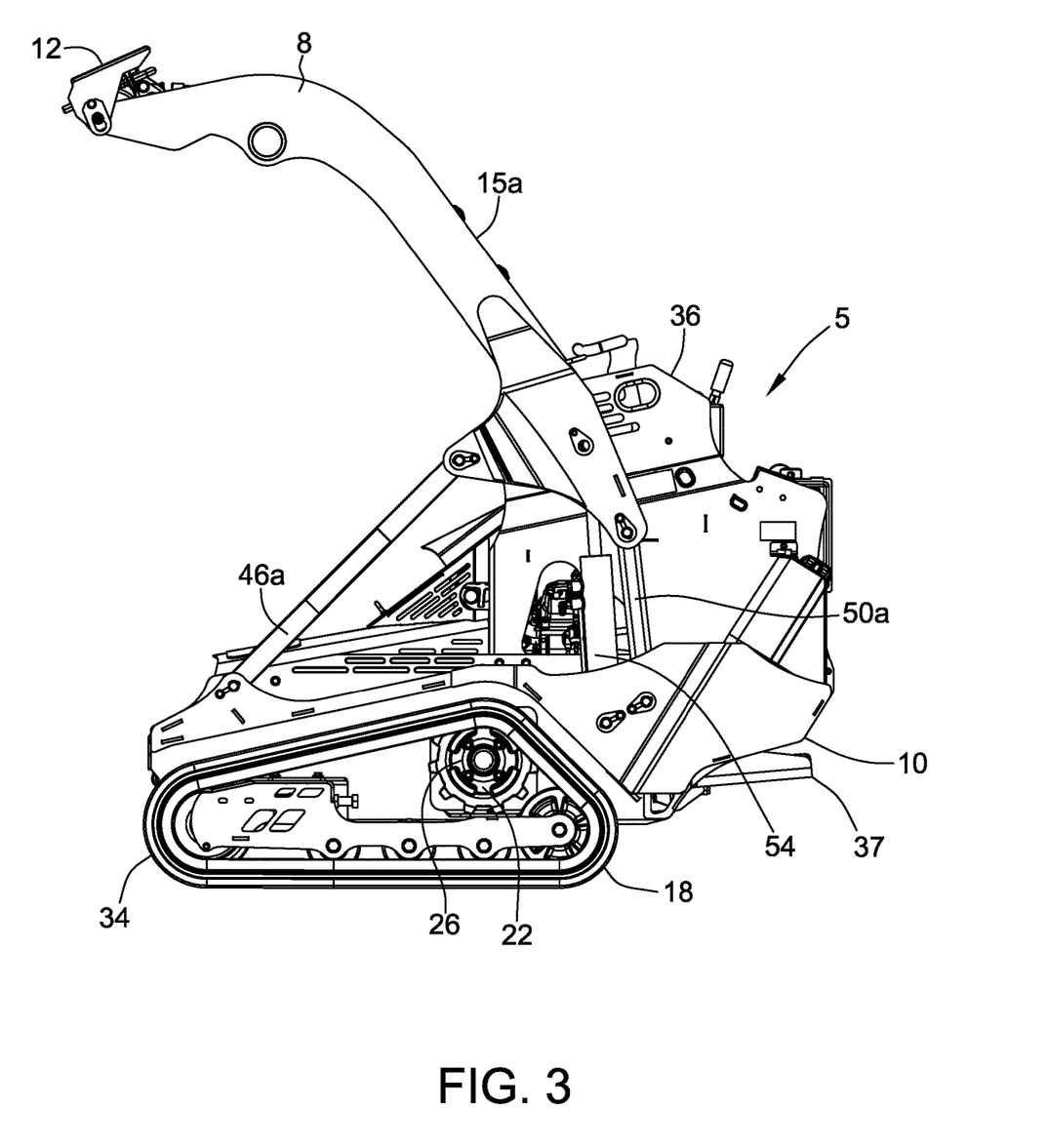
FIG. 3 is a side view of the compact tool carrier with the loader in a raised position.
Figure 4:
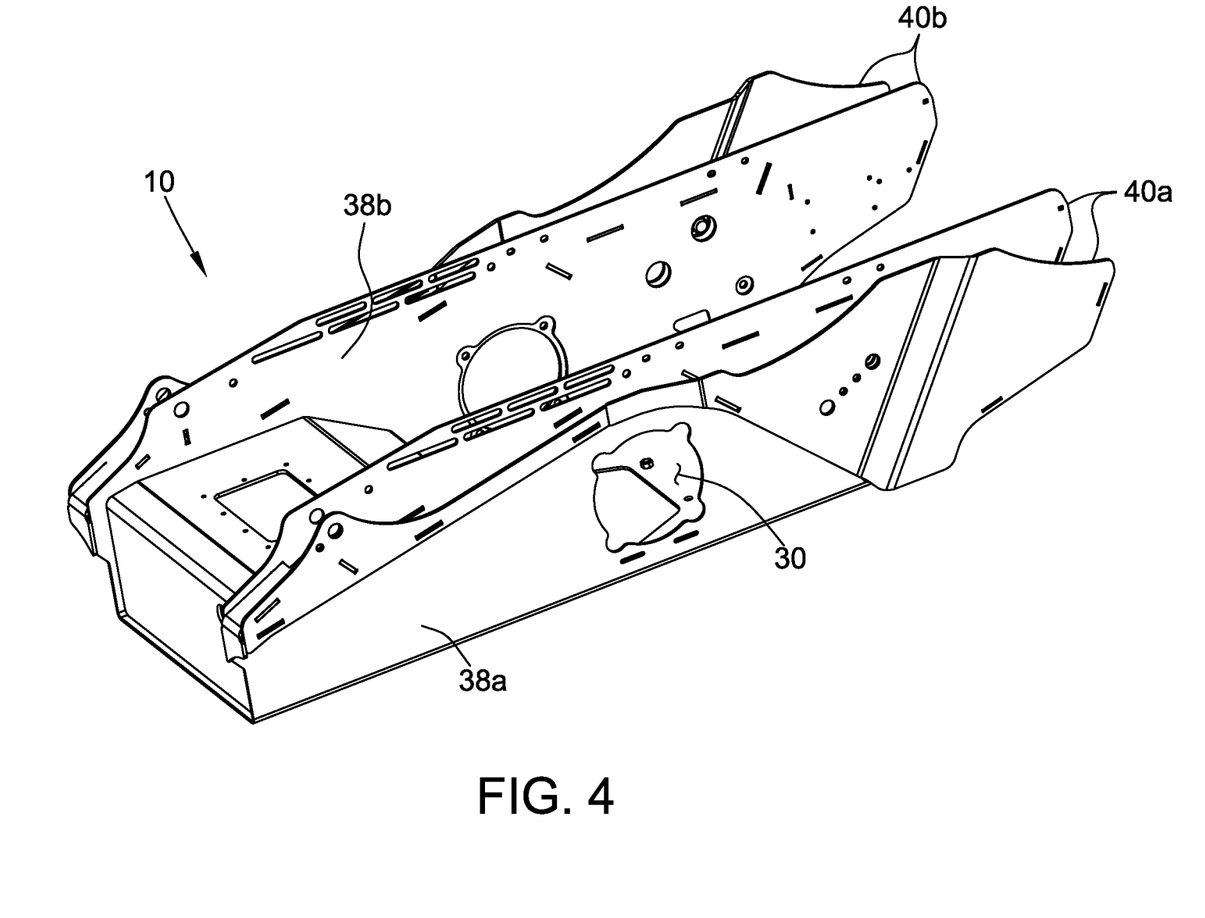
FIG. 4 is a perspective view of a mainframe of the compact tool carrier.
Figure 5:
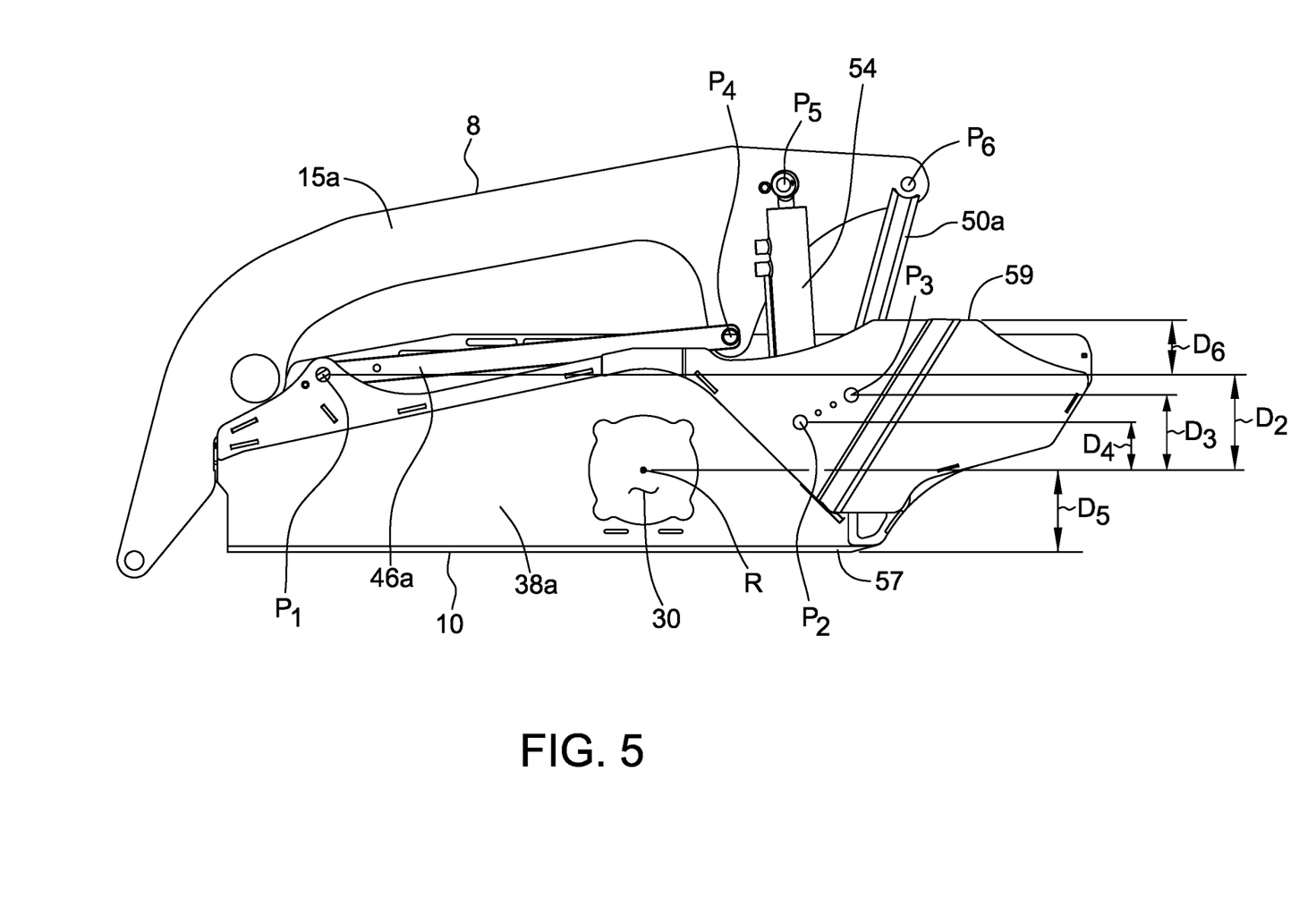
FIG. 5 is a side view of the mainframe and loader of the compact tool carrier.

The compact tool carrier 5 includes a drive mechanism 18 attached to the mainframe 10. In the illustrated embodiment, the drive mechanism 18 is directly mounted (i.e., connected without intermediary parts) to the mainframe 10 by way of drive sprocket 22 connected to a hub 26 (FIG. 2). The hub 26 is attached to a shaft (not shown) that extends through a drive opening 30 (FIG. 4) of the mainframe 10. The sprocket 22, hub 26 and shaft (not shown) rotate about a rotational axis R (FIG. 5). As shown, the drive mechanism 18 includes tracks 34. In other embodiments, the drive mechanism 18 includes wheels.

The compact tool carrier 5 includes a control station 36 (FIG. 1) which may include controls (not all controls being shown) for propelling the compact tool carrier 5 forward and/or for raising and lowering the loader 8. The control station 36 may be mounted toward the rear of the compact tool carrier 5 (i.e., opposite the attachment plate 12) and is generally adapted to allow for standing or walk-behind operation. As used herein, "standing operation" generally refers to operation in which the operator stands on a platform attached to the compact tool carrier while "walk-behind operation" generally refers to operation in which the operator stands on the surface supporting the compact tool carrier 5. In the illustrated embodiment, the compact tool carrier 5 includes an operator platform 37 (FIG. 2).

In embodiments in which the compact tool carrier 5 includes an operator platform 37 for standing operation, the difference between the height of the control station 36 (e.g., as measured from the highest control for operating the loader or propelling the apparatus forward) and the platform 37 may be at least about 90 cm (e.g., from about 90 cm to about 130 cm). In embodiments in which the operator walks behind the compact tool carrier 5, the control station 36 may be at least about 90 cm (e.g., from about 90 cm to about 130 cm) from the surface supporting the compact tool carrier. Such a range generally complies with the zones of comfort and reach for controls in earth-moving equipment set forth in ISO 6682 (2008) as determined from the physical dimensions of operators and minimum operator space envelope as set forth in ISO 3411 (2007), both of which are incorporated herein by reference for all relevant and consistent purposes.

In the illustrated embodiment, the control station 36 is attached to an upper frame 39 (FIG. 7) that is attached and supported by the mainframe 10. In other embodiments, rather than being integrated as one unit in the compact tool carrier 5, the control station 36 is separate from the body (e.g., mainframe) of the carrier and is operated remotely. In such embodiments, the control station 36 may be wired or may operate wirelessly to propel the carrier 5 and/or raise and lower the loader 8.

The mainframe 10 includes a first side 38a and a second side 38b generally opposite the first side 38a. As used herein, the term "mainframe" generally refers to a single weldment to which the loader 8 is attached, optionally through one or more pivotal linkages. The mainframe 10 includes bracket portions 40a, 40b (FIG. 4) through which various pivot linkages are attached. In the illustrated embodiment, the engine (not shown) and the drive mechanism 18 comprising tracks or wheels are directly connected to the mainframe 10.

The first loader arm 15a is pivotally connected to the first side 38a of the mainframe 10, and the second loader arm 15b is pivotally connected to the second side 38b of the mainframe 10. The loader arms 15a, 15b and sides 38a, 38b of the mainframe 10 each include three pivot points for pivoting the loader 8 relative to the mainframe 10. The first side 38a of the mainframe 10 includes a forward pivot point $P_1$ (FIG. 5) a rear pivot point $P_3$ and a central pivot point $P_2$ between the forward pivot point $P_1$ and the rear pivot point $P_3$. Similarly, the first arm 15a includes a forward pivot point $P_4$, a rear pivot point $P_6$ and a central pivot point $P_5$ between the forward pivot point $P_4$ and the rear pivot point $P_6$. The compact tool carrier 5 includes a first forward linkage 46a attached to the first side 38a of the mainframe 10 at its forward pivot point $P_1$ and attached to the first arm 15a at its forward pivot point $P_4$. A first rear linkage 50a is attached to the first side 38a of the mainframe 10 at its rear pivot point $P_3$ and is attached to the first arm 15a of the loader 8 at its rear pivot point $P_6$. While the carrier 5 is shown with two loader linkages 46a, 50a on each side of the carrier 5, in other embodiments the carrier 5 includes a single linkage.

An actuator 54, shown such as a hydraulic cylinder, is attached to the first side 38a of the mainframe 10 at its center pivot point $P_2$ and is attached to the loader arm 15a at its center pivot point P5 to raise the loader 8. The compact tool carrier 5 may include a single actuator 54, or, as in other embodiments, a second actuator (not shown) is connected to the second side 38b (FIG. 4) of the mainframe 10 and the second arm 15b (FIG. 1). The actuator 54 is powered to raise the loader 8 and, in some embodiments, is also powered to lower the loader 8 (as opposed to a one-way actuator lowered by gravity alone).

The second side 38b (FIG. 4) of the mainframe 10 may include a forward pivot point and a rear pivot point to which a second forward linkage 46b (FIG. 1) and second rear linkage (not shown) are respectively attached. The second arm 15b may also include a forward pivot point and rear pivot point to which the second forward linkage 46b and second rear linkage are attached. In embodiments in which the compact tool carrier 5 includes a second actuator (not shown), the second side 38b of the mainframe 10 includes a central pivot point between its forward pivot point and its rear pivot point, and the second arm 15b also includes a central pivot point between its forward pivot point and its rear pivot point. The second cylinder may be attached to the central pivot point of the second side 38b of the mainframe 10 and the central pivot point of the second arm 15b.

In some embodiments, the first and second ends 38a, 38b of the mainframe 10 and the first and second loader arms 15a, 15b do not include more than three pivot points at which the mainframe 10 and loader 8 pivot relative to each other. While the actuator 54 is shown as being attached between the other two linkages 46a, 50a, in other embodiments the actuator 54 is forward to both linkages 46a, 50a or rearward to both linkages 46a, 50a. Further, each side of the carrier 5 having an actuator 54 may include a single linkage rather than two linkages.

In some embodiments, the mainframe 10 is characterized by a relatively low profile (i.e., the pivot points are positioned relatively low on the mainframe allowing its height to be reduced). The rotational axis R (FIG. 5) and the bottom of the compact tool carrier 5 (FIG. 2) are separated by a distance D1. Generally, the bottom of the compact tool carrier 5 corresponds to the point at which the drive mechanism 18 contacts the surface supporting the compact tool carrier 5. The rotational axis R and the forward pivot point $P_1$ of the first side 38a of the mainframe 10 are separated by a vertical distance D2. The rotational axis R and the rear pivot point $P_3$ are separated by a vertical distance D3. The rotational axis R and the central pivot point $P_2$ are separated by a vertical distance D4. Each of D2, D3 and D4 is less than about 1.5 times D1 (1.5×D1). In some embodiments, each of D2, D3 and D4 is less than D1 or even less than about 0.75 times D1 (0.75×D1).

The mainframe 10 profile may also be expressed relative to the distance D5 between the rotational axis R (FIG. 5) and the bottom 57 of the mainframe 10. Each of D2, D3 and D4 is less than about twice D5 (2×D5). In some embodiments, each of D2, D3 and D4 is less than about 1.75 times D5 (1.75×D5) or less than about 1.5 times D5 (1.5λD5). P2 and P3 may be relatively lower than P1 and their distances D3, D4 from the rotational axis R may be even less than about 1.25 times D5 (1.25×D5). The distance D6 between the top 59 of the first side 38a of the mainframe 10 and the highest pivot point ($P_1$ in the illustrated embodiment), is less than about 1.5 times D5, less than about D5 or less than about 0.75 times D5.

The second side 38b (FIG. 1) of the mainframe 10 may have a similar pivot point arrangement. The rotational axis R and the forward pivot point of the second side 38b are separated by a vertical distance D2' (not shown). The rotational axis R and the rear pivot point of the second side are separated by a vertical distance D3' (not shown). The rotational axis R and the central pivot point (if any) of the second side 38b of mainframe 10 are separated by a vertical distance D4' (not shown). Each of D2', D3' and D4' is less than about 1.5 times D1 (1.5×D1) or less than D1 or even less than about 0.75 times D1 (0.75×D1). The rotational axis R and the bottom of the second side 38b of the mainframe 10 are separated by a vertical distance D5' (not shown). Each of D2', D3' and D4' is less than twice D5' (2×D5') or less than about 1.75 times D5' (1.75×D5') or less than about 1.5 times D5' (1.5λD5'). D3' and D4' may be even less than about 1.25 times D5' (1.25×D5'). The distance D6' between the top of the second side 38b of the mainframe 10 and the highest pivot point is less than about 1.5 times D5', less than about D5' or less than about 0.75 times D5'.

Figure 6:
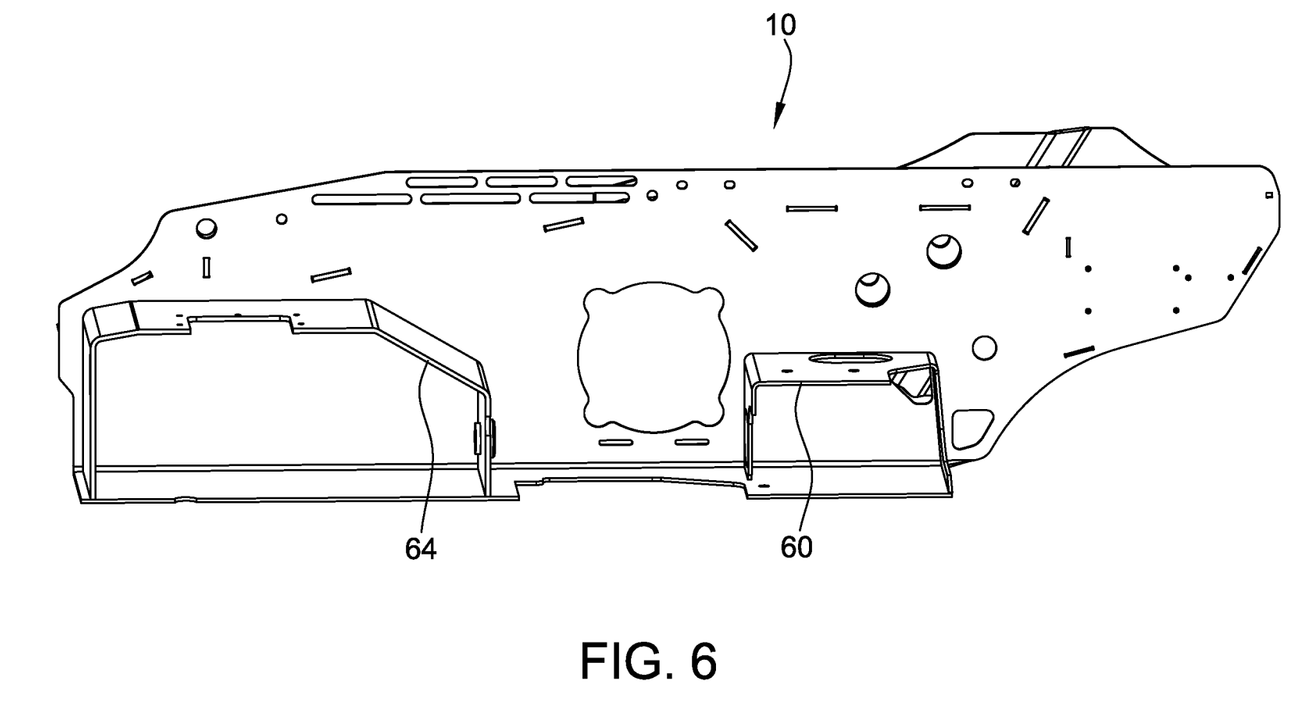
FIG. 6 is a cross-section side view of the mainframe.
Figure 7:
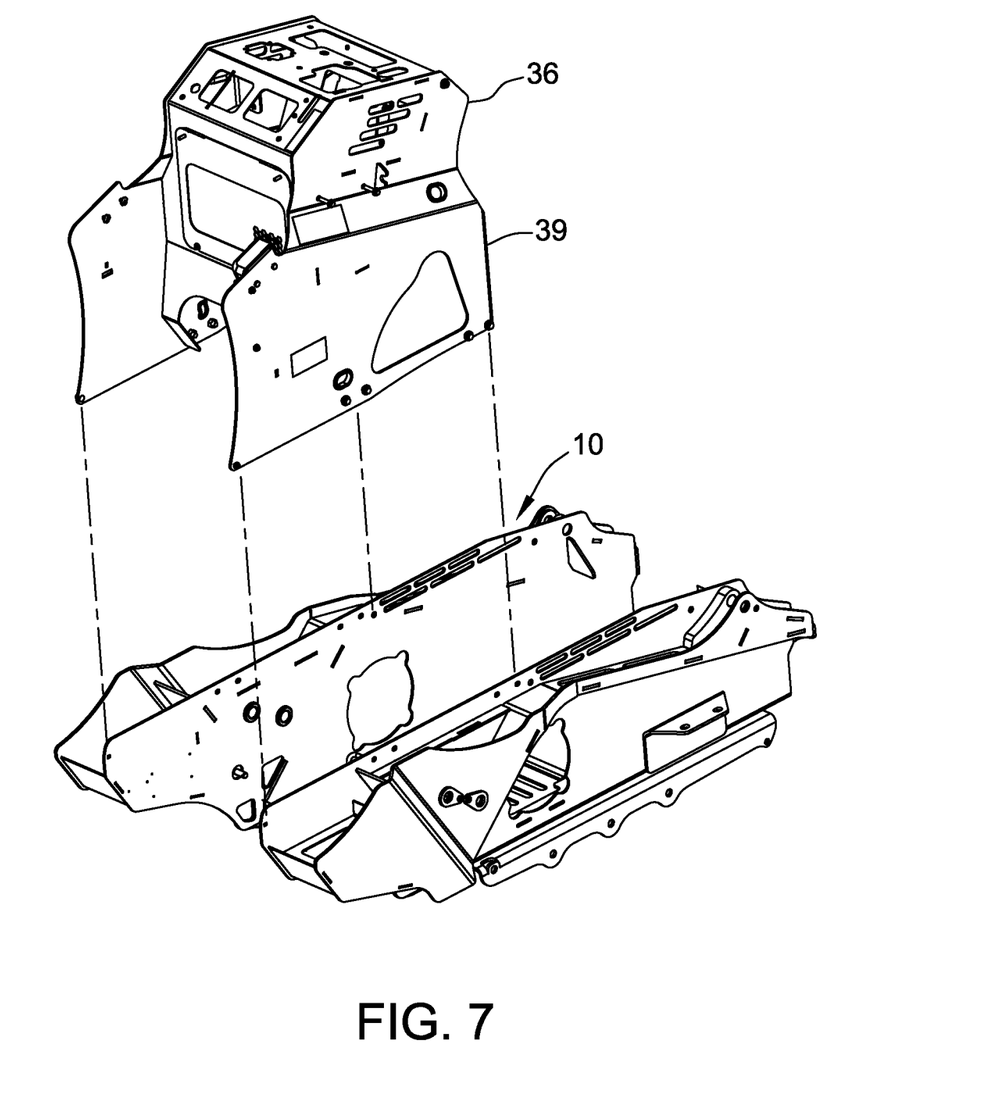
FIG. 7 is an exploded perspective view of the mainframe and an upper frame of the compact tool carrier.

The compact tool carrier 5 includes an engine (not shown) for propelling the drive mechanism 18. As shown in FIG. 6, the engine may be mounted to an engine bracket 60 that forms part of the mainframe 10. The engine may drive a hydraulic pump that powers hydraulic motors (not shown) which drive the drive mechanism 18 (FIG. 1) and which provide hydraulic power to actuator 54. The mainframe 10 includes a reservoir 64 for storing and cycling of hydraulic fluid.

Compared to conventional compact tool carriers, embodiments of the compact tool carrier 5 described above have several advantages. By positioning the pivot points relatively low on the mainframe 10, the mass of the mainframe 10 and the resulting cost of the carrier 5 may be reduced. Further, such a low-profile mainframe 10 improves visibility for the operator and allows the center of gravity of the carrier 5 to be lowered which improves its stability. In embodiments in which the carrier 5 includes an actuator 54 (FIG. 5) for lifting the loader 8 that is disposed between forward linkage 46a and a rear linkage 50a on at least one side 38a, 38b of the mainframe 10, the loader 8 is characterized by an travel path in which the loader travels vertically rather than over a radial path. The vertical travel path of the loader 8 is more effective relative to conventional travel paths for compact tool carriers 5 as the carrier 5 may operate closer to other structures.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A mainframe for a self-propelled machine, the mainframe having a front end, a rear end and a longitudinal axis and comprising:
   a first side comprising:
      a first bracket portion for supporting a load, the first bracket portion forming an upward-facing first pocket that extends from the front end to the rear end of the mainframe, the first side defining a first drive opening for receiving a first hub of a drive mechanism; and
      a plurality of first pivot points for attachment of a loader including a first front pivot point proximate the front end, a first rear pivot point proximate the rear end, and a first central pivot point located between the first front pivot point and the first rear pivot point along the longitudinal axis;
   a second side comprising:
      a second bracket portion for supporting a load, the second bracket portion forming an upward-facing second pocket that extends from the front end to the rear end of the mainframe, the second side defining a second drive opening for receiving a second hub of a drive mechanism; and a plurality of second pivot points for attachment of a loader including a second front pivot point proximate the front end, a second rear pivot point proximate the rear end, and a second central pivot point located between the second front pivot point and the second rear pivot point along the longitudinal axis; and a hydraulic reservoir housing configured to store hydraulic fluid, the hydraulic reservoir housing being connected to the first side of the mainframe and connected to the second side of the mainframe, the hydraulic reservoir housing being disposed between the front end of the mainframe and the first and second drive openings.

2. The mainframe as set forth in claim 1 further comprising an engine bracket that extends from the first side toward the second side for mounting an engine to the mainframe, the engine bracket being disposed between the rear end and the first and second drive openings.

3. The mainframe as set forth in claim 1 wherein the mainframe is a single weldment.

4. A compact tool carrier having a longitudinal axis and comprising:
   a loader having a loader arm, the loader being adapted to carry a tool;
   a mainframe for supporting the loader, the mainframe having a first side and a second side, and having a front end and a rear end relative to the longitudinal axis;
   a first linkage pivotally attached to the first side of the mainframe and directly pivotally attached to the loader arm;
   a second linkage pivotally attached to the first side of the mainframe and directly pivotally attached to the loader arm;
   an actuator pivotally attached to the first side of the mainframe and directly pivotally attached to the loader arm; and
   a control station having operator controls for propelling the compact tool carrier forward and for raising and lowering the loader, the control station being mounted toward the rear end of the compact tool carrier.

5. The compact tool carrier as set forth in claim 4, wherein the mainframe comprises an engine bracket that extends from the first side toward the second side for mounting an engine to the mainframe, the engine bracket being spaced from the rear end of the mainframe.

6. The compact tool carrier as set forth in claim 5 comprising an engine to propel a drive mechanism, the engine being attached to the engine bracket.

7. The compact tool carrier as set for in claim 4, wherein the mainframe incorporates a single weldment.

8. The compact tool carrier as set forth in claim 4, wherein the loader arm is a first loader arm, the loader comprising a second loader arm and the compact tool carrier comprising a third linkage pivotally attached to the second side of the mainframe and pivotally attached to the second loader arm and a fourth linkage pivotally attached to the second side of the mainframe and pivotally attached to the second loader arm.

9. The compact tool carrier as set forth in claim 8, wherein the actuator is a first actuator, the compact tool carrier comprising a second actuator, the second actuator being pivotally attached to the second side of the mainframe and pivotally attached to the second loader arm.

10. The compact tool carrier as set forth in claim 4 comprising a drive mechanism comprising tracks or wheels, the drive mechanism being attached to the mainframe.

11. The compact tool carrier as set forth in claim 4, wherein the actuator is a hydraulic cylinder.

12. The compact tool carrier as set forth in claim 4, wherein the loader arm incorporates a single weldment.

13. The compact tool carrier as set forth in claim 4, wherein the mainframe defines a pocket toward a rear of the mainframe to partially surround an operator.

14. The compact tool carrier as set forth in claim 13 further comprising an operator platform at least partially within the pocket.

* * * * *